United States Patent [19]

Hauser

[11] 4,454,456
[45] Jun. 12, 1984

[54] METHOD AND CIRCUIT FOR OPERATING A SPRAY GUN HAVING A VIBRATING ARMATURE DRIVE

[75] Inventor: Wolfgang Hauser, Tuebingen, Fed. Rep. of Germany

[73] Assignee: Hugo Brennenstuhl GmbH & Co. KG, Tuebingen, Fed. Rep. of Germany

[21] Appl. No.: 261,338

[22] Filed: May 7, 1981

[51] Int. Cl.$^3$ .................................................. H02K 33/00
[52] U.S. Cl. .................................. 318/129; 318/132; 417/417; 239/332
[58] Field of Search .......................... 318/119–135, 318/114; 239/332, 302; 417/416, 417, 45

[56] References Cited

U.S. PATENT DOCUMENTS

| | | | |
|---|---|---|---|
| 3,412,300 | 11/1968 | Westenskow | 318/561 |
| 3,502,026 | 3/1970 | Toyoda | 318/471 |
| 3,899,134 | 8/1975 | Wagner | 239/332 |
| 3,966,358 | 6/1976 | Heimes et al. | 417/45 |
| 4,027,211 | 5/1977 | Omura et al. | 318/127 |
| 4,086,518 | 4/1978 | Wilkinson | 417/417 |

OTHER PUBLICATIONS

Understanding Solid-State Electronics, Developed and Published by Texas Instruments Learning Center, p. 174, copyright 1972, 1978.

*Primary Examiner*—S. J. Witkowski
*Assistant Examiner*—Arthur G. Evans
*Attorney, Agent, or Firm*—Flynn, Thiel, Boutell & Tanis

[57] ABSTRACT

The invention deals with a method and a circuit for operating a spray gun having a vibrating armature drive which is energized with an electrical a.c. signal. To reduce the liquid which is sprayed per unit of time by the spray gun, a pulse width modulated energizing signal with abruptly rising leading edges is fed to the vibrating armature drive. The circuit includes a control circuit which produces a control signal with abruptly rising leading edges and a controllable switch which electrically couples a supply voltage source and the vibrating armature drive, the control terminal of the switch being connected to the output of the control circuit. The circuit may alternatively have a signal generator which produces a control signal with abruptly rising leading edges and a power amplifier connected to the output of the signal generator, the output of the power amplifier being connected to the vibrating armature drive.

11 Claims, 3 Drawing Figures

METHOD AND CIRCUIT FOR OPERATING A SPRAY GUN HAVING A VIBRATING ARMATURE DRIVE

FIELD OF THE INVENTION

The invention relates to a spray gun having a vibrating armature drive and to circuits for energizing the vibrating armature drive.

BACKGROUND OF THE INVENTION

Spray guns with vibrating armature drives typically have a piston which is movable in a pump cylinder, is urged toward one position by a tension spring to suck in liquid and can be shifted against the force of the tension spring by an electromagnet to convey the sucked-in liquid to a spray head of the spray gun. The pump piston, the armature of the electromagnet and the tension spring together form a system capable of vibrating in response to energy supplied continuously thereto from an a.c. voltage network during spraying of the liquid.

In these known spray guns, it is possible to adjust the spray output, namely, the amount of liquid which is sprayed per unit of time, by limiting the suction stroke of the pump piston with an adjustable mechanical stop. In this manner, however, the spray output can only be reduced to approximately 300 g/min., since a further reduction of the piston suction stroke will cause the liquid to be no longer satisfactorily sprayed.

The purpose of the present invention is to provide a method and a circuit for operating a spray gun having a vibrating armature drive which assures good spraying of the liquid even in the case of a small spray output.

SUMMARY OF THE INVENTION

The foregoing and other purposes of the invention are met by providing a method and circuit for controlling the vibrating armature drive of a spray gun of the foregoing type in which an a.c. energizing signal having abruptly rising leading edges and a variable pulse width is supplied to the vibrating armature drive.

Up to now, the adjustment of the spray output in vibrating armature driven spray guns was effected by adjusting the end of the suction stroke, the end of the conveying stroke being chosen independently of the spray output and at most being adjusted according to the viscosity of the liquid to be sprayed, and the pump piston at the same time effecting a forced operation of a check valve on the conveying side thereof (compare Swiss Pat. No 360 625). The present invention works with a fixed and predetermined end point for the suction stroke and, through variation of the total effective electrical power fed to the vibrating armature drive, varies the end point of the piston conveying stroke. With this, it is possible to supply with the pump piston a very small amount of liquid to the spray head with each stroke by stopping the pump piston shortly after the point in time at which it passes a suction opening provided in a sidewall of the pump cylinder. One obtains at the spray head the high pressure which is necessary for a fine spraying of the liquid because the vibrating armature drive is energized by successive pulses having abruptly rising leading edges which effect abrupt acceleration of the piston.

The present invention has further important advantages, compared with the state of the art, including a considerable reduction in the noise produced during operation and a better stability of the spray output once it has been adjusted. In the known spray guns, a hard hitting of the armature connected to the piston occurs against a housing-fixed stop at the end of the suction stroke, which results in an unpleasant rattling noise. Also, this hard hitting can alter the positional adjustment of the stop itself, namely, in a direction effecting a greater spray output, which is very undesirable, especially during the application of fine lacquers.

In one further development of the invention, a particularly abrupt stopping of the pump piston is obtained. With this, it is possible to adjust the spray output to a particularly small value but still assure that during the quick movement of the pump piston between the abrupt acceleration and the abrupt stopping the necessary high pressure in the spray head of the spray gun is built up.

A further development can be carried out particularly simply by using easily available supply voltage sources. For this, in particular, the common a.c. voltage network and d.c. voltage sources can be used.

BRIEF DESCRIPTION OF THE DRAWING

The invention will be discussed in greater detail hereinafter in connection with exemplary embodiments with reference to the enclosed drawing, in which.

DETAILED DESCRIPTION

Figure 1:
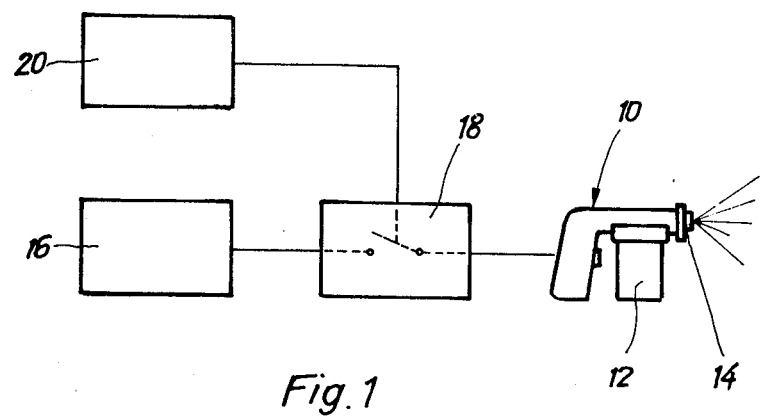
FIG. 1 is a schematic illustration of a spray gun with a vibrating armature drive and an operating circuit therefor.

FIG. 1 schematically illustrates a spray gun 10 having a vibrating armature drive which is not shown in detail and which includes a pump piston which can be reciprocated in a horizontal direction within a pump cylinder. A suction opening is provided in the cylinder wall of the pump cylinder and is connected by a suction pipe to a storage reservoir 12 for the liquid to be sprayed. The pump which is formed by the pump piston and the pump cylinder does not have a separate suction valve on the suction side, but rather operates on the suction side with aperture control effected by the piston itself. A check valve is provided in the pump cylinder on the outlet side thereof, through which valve the conveyed liquid is fed to a spray head 14. These details of the pump design and of the vibrating armature drive are not illustrated in the drawings because they are known to the man skilled in the art.

An operating circuit for the spray gun 12 is disclosed in the form of a block diagram in FIG. 1 and includes a supply voltage source 16, a controllable switch 18 and a signal generator 20. The supply voltage source 16 is preferably a d.c. supply, for example, a battery or an a.c. power supply and a rectifier. The signal generator 20 has an adjustable pulse width and preferably has in addition an adjustable frequency. The controllable switch 18 is preferably a semiconductor switch, in particular a power transistor or a thyristor. These electronic building elements are actually known and can be obtained in commerce in various forms and need not be described in any greater detail here.

The arrangement which is shown in FIG. 1 operates as follows. The signal generator 20 produces a square wave signal with abruptly rising leading edges and abruptly falling trailing edges. This control signal is made available with little output power and serves to modulate by means of the switch 18 the supply voltage applied to the input side of the switch 18. Thus, one obtains at the output of the switch 18 an energizing signal for the spray gun having the same frequency and the same keying ratio (period/pulse width) as the control signal, but having a higher output power. With this, a magnetic field is periodically and abruptly built up and reduced in the field coil of the vibrating armature drive of the spray gun, causing the pump piston to be repeatedly and abruptly accelerated and stopped. The amplitude of the pump conveying stroke can be reduced by increasing the keying ratio of the control signal, for example, by reducing the pulse width of the control signal, since the total energy per unit time which is fed to the vibrating armature drive is reduced accordingly but very quick build-up and reduction of the magnetic field is still achieved. For an optimum adjustment of the control signal to the dynamic characteristics of the vibrating armature drive and the pump at small conveying stroke amplitudes, it is possible to change the frequency of the control signal slightly when changing the keying ratio. This change in frequency can in practice be effected simultaneously with the change in the keying ratio, for example, by mechanically coupling two potentiometers of the square wave signal generator which respectively control the pulse width and the period.

Figure 2:
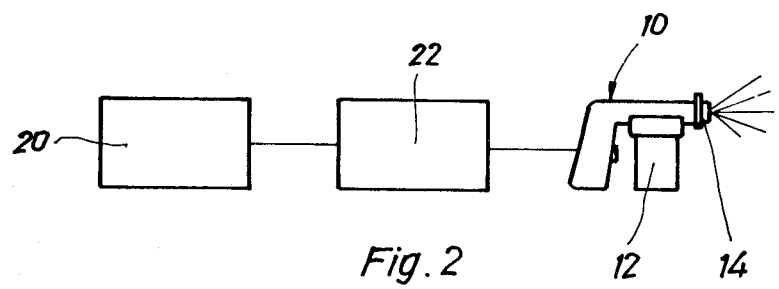
FIG. 2 illustrates a modified embodiment of the operating circuit of FIG. 1.

FIG. 2 illustrates an operating circuit very similar to the one in FIG. 1, the only significant difference being that a power amplifier 22 is provided in place of the supply voltage source and controllable switch and amplifies the control signal from the signal generator 20 to produce the energizing signal fed to the spray gun 10. Operation of this operating circuit produces the same result as operation of the operating circuit of FIG. 1.

Figure 3:
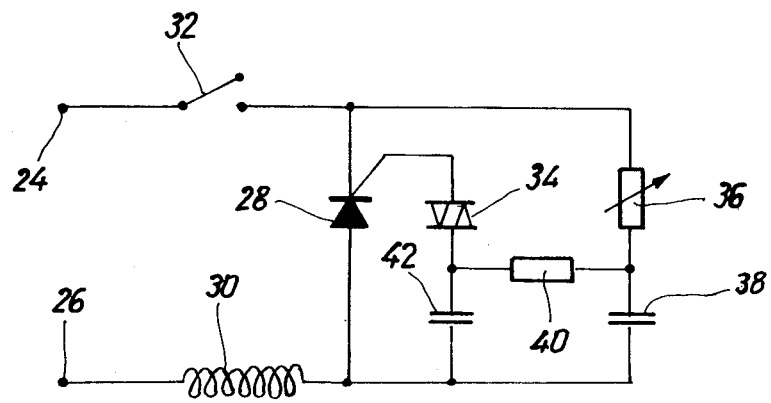
FIG. 3 is a circuit diagram illustrating an operating circuit for a spray gun having a vibrating armature drive.

FIG. 3 illustrates details of a particular operating circuit for the embodiment of FIG. 1, wherein the supply voltage source is shown as power terminals 24,26 connectable to an a.c. power network.

A thyristor 28 is provided as the controllable switch and is switched in series with the coil 30 of the vibrating armature drive and a main switch 32 which can be operated manually. The gate terminal of the thyristor 28 is connected through a bi-directional diode 34 to a phase-shifting voltage divider circuit which is connected in series across the thyristor 28 and consists of an adjustable resistor 36 and a capacitor 38, the latter being bridged by yet a further series connection of a resistor 40 and a capacitor 42. The network junction between the resistor 40 and the capacitor 42 represents the output of the phase-shifting voltage divider circuit and is connected to the bi-directional diode 34.

By adjusting the resistor 36 it is possible to adjust the phase angle at which the thyristor 28 fully modulates. When full modulation occurs, voltage is applied to the coil 30 with a quickly rising edge so that quick acceleration of the pump piston occurs. By increasing the phase angle at which the thyristor 28 fully modulates, the keying ratio can be increased and the amplitude of movement of the pump piston can be reduced. In practice, phase angles of between 15° and 170° can be effected, and consequently the stroke of the pump piston can be varied within very wide limits.

The operating circuit which is shown in FIG. 3 can, if desired, be easily incorporated into the housing of the spray gun with the vibrating armature drive.

If one uses a triac in place of the thyristor 28 of FIG. 3, then it is possible to operate the vibrating armature drive at twice the frequency of the a.c. power source.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a method for operating a spray gun having a vibrating armature drive which includes the step of energizing said vibrating armature drive with an electrical a.c. signal, the improvement comprising the steps of pulse width modulating said energizing signal fed to said vibrating armature drive and providing said energizing signal with abruptly rising leading edges and abruptly falling trailing edges, said abruptly rising edges being produced by the step of switching a signal which is slowly variable when compared with the rise time at said abruptly rising edges, thereby controlling the volume of liquid which is sprayed per unit of time by said spray gun, and including the step of increasing the keying ratio of said pulse width modulated signal while maintaining the amplitude thereof, thereby reducing the volume of liquid sprayed.

2. The method according to claim 1, wherein said pulse width modulated energizing signal fed to said vibrating armature drive also has abruptly falling trailing edges.

3. The method according to claim 1 or 2, wherein said abruptly rising edges are produced by switching a signal which is slowly variable when compared with the rise time of said abruptly rising edges.

4. The method according to claim 1 or 2, including the step of increasing the keying ratio of said pulse width modulated signal while maintaining the amplitude thereof, thereby reducing the volume of liquid sprayed.

5. In a circuit for producing an electrical a.c. signal to energize a vibrating armature drive in a spray gun which is adapted to spray a fluid, the improvement comprising a control circuit which produces a pulse width modulated control signal having abruptly rising leading edges and a controllable switch for electrically coupling a supply voltage source and said vibrating armature drive, a control terminal of said switch being connected to an output of said control circuit, said pulse width modulated control signal having abruptly rising leading edges causing the spray gun to produce a spray having relatively uniform characteristics across a range of fluid flow rates which includes low fluid flow rates.

6. The circuit according to claim 5, wherein said supply voltage source is an a.c. voltage source, said control circuit includes a phase shifter circuit responsive to said a.c. voltage source, and said controllable switch includes one of a thyristor and a triac.

7. The circuit according to claim 6, including a bidirectional diode connected between an output of said phase shifter circuit and said a control terminal of said one of a thyristor and a triac.

8. The circuit according to claim 5, wherein said control circuit includes one of a square wave signal generator and a saw tooth wave signal generator.

9. The circuit according to one of the claims 5 to 8, including a manually operable switch connected in series with said controllable switch.

10. In a circuit for producing an electrical a.c. signal to energize a vibrating armature drive in a spray gun which is adapted to spray a fluid, the improvement comprising a signal generator which produces a pulse width modulated control signal having abruptly rising leading edges and a power amplifier which is connected to an output of said signal generator, an output of said power amplifier being connected to said vibrating armature drive, said pulse width modulated control signal having abruptly rising leading edges causing the spray gun to produce a spray having relatively uniform characteristics across a range of fluid flow rates which includes low fluid flow rates.

11. In a circuit for producing an electrical a.c. signal to energize a vibrating armature drive in a spray gun which is adapted to spray a fluid, the improvement comprising a control circuit which produces a pulse width modulated control signal having abruptly rising leading edges and a controllable switch for electrically coupling a supply voltage source and said vibrating armature drive, a control terminal of said switch being connected to an output of said control circuit, said pulse width modulated control signal having abruptly rising leading edges causing the spray gun to produce a spray having relatively uniform characteristics across a range of fluid flow rates which includes low fluid flow rates; and wherein said control circuit includes: an a.c. power source, a manually actuable switch and a thyristor connected in series with each other, the anode of said thyristor being at one end of and said armature drive being connected in parallel with said series-connected power source, switch and thyristor; first and second capacitors which each have one terminal connected to the anode of said thyristor; a bi-directional diode connected between the other terminal of said first capacitor and the gate of said thyristor; a variable resistor connected between the other terminal of said second capacitor and the cathode of said thyristor; and a resistor connected between said other terminal of said first capacitor and said other terminal of said second capacitor.

* * * * *